United States Patent
Chen

(10) Patent No.: US 6,189,845 B1
(45) Date of Patent: Feb. 20, 2001

(54) TRIPOD

(76) Inventor: Amy Chen, 6F, No.17, Der-Huey Street, Taipei (TW)

( * ) Notice: Under 35 U.S.C. 154(b), the term of this patent shall be extended for 0 days.

(21) Appl. No.: 09/262,931

(22) Filed: Mar. 5, 1999

(51) Int. Cl.$^7$ .................................................. F16M 11/02
(52) U.S. Cl. .............................. 248/177.1; 248/292.12; 403/97
(58) Field of Search ........................ 248/177.1, 178.1, 248/187.1, 188.7, 168, 188, 188.4, 923, 179.1, 183.4, 292.12, 125.8; 403/93, 94, 97

(56) References Cited

U.S. PATENT DOCUMENTS

| | | | |
|---|---|---|---|
| 3,490,724 | * 1/1970 | Ichikawa | 248/178 |
| 3,980,409 | * 9/1976 | Turner | 403/108 |
| 5,390,885 | * 2/1995 | Shen | 248/168 |
| 5,540,017 | * 7/1996 | Eilam et al. | 52/118 |
| 5,647,565 | * 7/1997 | Wei | 248/168 |
| 5,772,164 | * 6/1998 | Shen | 248/170 |
| 5,913,382 | * 6/1999 | Martin | 182/204 |
| 6,068,224 | * 5/2000 | Horiuchi | 248/187.1 |

* cited by examiner

Primary Examiner—Leslie A. Braun
Assistant Examiner—Kimberly Wood

(74) Attorney, Agent, or Firm—Donald C. Casey, Esq.

(57) ABSTRACT

A tripod, in particular a mini tripod for mounting lockably a photographic apparatus, includes a platform, a base, and a plurality of legs. The joint between the platform and the base serves as a pivot whereby the platform can perform deviation within a limited distance. A through hole is provided to go through from one lateral side of the base to the other lateral side. An axial block 44 is fitted into one end of the through hole 21 for abutting a corresponding surface of the platform. The other end of the through hole is provided with a nut receiving recess and a left clutch receiving recess for receiving a nut and a left clutch, respectively. A right clutch is provided on a corresponding side of the platform. A rotary knob having a screw rod passes through the platform to screwably join the right clutch, the left clutch, and the nut. The rotary knob is turnable to drive the screw rod into the base so that the teeth of the left and right clutches interengage to achieve firm positioning of the platform. Turning of the rotary knob in a reverse direction causes the screw rod to withdraw so that the teeth of the left and right clutches disengage. At this time, the platform is unconstrained and can deviate for adjustment purposes. The tripod provides a considerable firm and strong support. Besides, it allows for quick adjustment and firm mounting of the photographic apparatus on the platform. Furthermore, the tripod is compact to carry and store.

2 Claims, 5 Drawing Sheets

TRIPOD

BACKGROUND OF THE INVENTION (a) Field of the Invention

The present invention relates to a tripod, and more particularly to a mini tripod that provides a considerable supporting force for supporting a photographic apparatus, that allows for easy and quick adjustment, and that is compact to carry and store.

(b) Description of the Prior Art

In general, the structure of a mini tripod is as that shown in FIG. 1. It essentially comprises a platform A1 for mounting lockably a photographic apparatus thereon, a substantially hollow frame A3, and a plurality of movable legs A2. A lower end of the platform A1 is connected to a spherical connector A11 to enable the connector A11 to be accommodated within the frame A3. The frame A3 is provided with an urging block A5 that has a nest shaped upper surface that can be in contact with the connector A11. One lateral side of the frame A3 is formed with a screw hole in a suitable position for passage of a rotary rod A4. The rotary rod A4 has a rear end shaped substantially like a conic adapted to contact a lower end of the urging block A5. In use, the rotary rod A4 is driven into or out of the frame A4. As the rear end of the rotary rod A4 is conical and is in contact with the lower end of the urging block A5, when the rotary rod A4 is turned outwardly, the urging block A5 will lower, causing the connector A11 connected to the lower end of the platform A1 to come to a movable state, thus allowing adjustment of the position of the photographic apparatus B thereon. When the rotary rod A4 is driven into the frame A3, the urging block A5 will be urge upwardly due to the conical rear end of the rotary rod A4, thereby causing the connector A11 to be clamped between the frame A3 and the urging block A5 in a secure manner. However, in this method that utilizes pressure to achieve positioning, the movable members are prevented from free movement totally by the utilization of friction. For relatively light photographic apparatus, the above-described structure can provide a certain securing function. However, for heavy (or precision) photographic apparatus, the securing effect is not very satisfactory. Oftentimes, because the weight of the photographic apparatus is far greater than the friction the tripod relies upon for securing purposes, the adjusted photographic angle or position may alter. And when the user wishes to re-adjust the angle or Position, he needs to apply a greater force to turn the rotary rod A4 inwardly into the frame A3 in order to obtain a greater securing frictional force. Upon a period of use, the urging block A5 and the conical rear end of the rotary rod A4 will wear, which leads to still smaller securing frictional force. Reduced securing friction means that a still greater force to turn the rotary rod A4. The consequence of such a vicious cycle is short service life of the tripod.

SUMMARY OF INVENTION

A primary object of the present invention is to provide a tripod for mounting of a photographic apparatus. The tripod provides a firm and support and allows for easy adjustment. The tripod, provided with telescopic legs, is compact to carry and store.

In order to achieve the above-mentioned object, the tripod of the present invention includes a rotary knob having a screw rod that passes through a platform to screwably couple a right clutch, a left clutch, and a nut. By turning the rotary knob to drive the screw rod into a base, teeth of the left and right clutches inter-engage to achieve firm positioning. Turning of the rotary knob in a reverse direction causes the screw rod to retract, allowing the teeth of the left and right clutches to disengage. Aside from providing a stable locking function, the tripod reduces wear considerably. Furthermore, it does not require a large locking force in order to achieve firm positioning.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
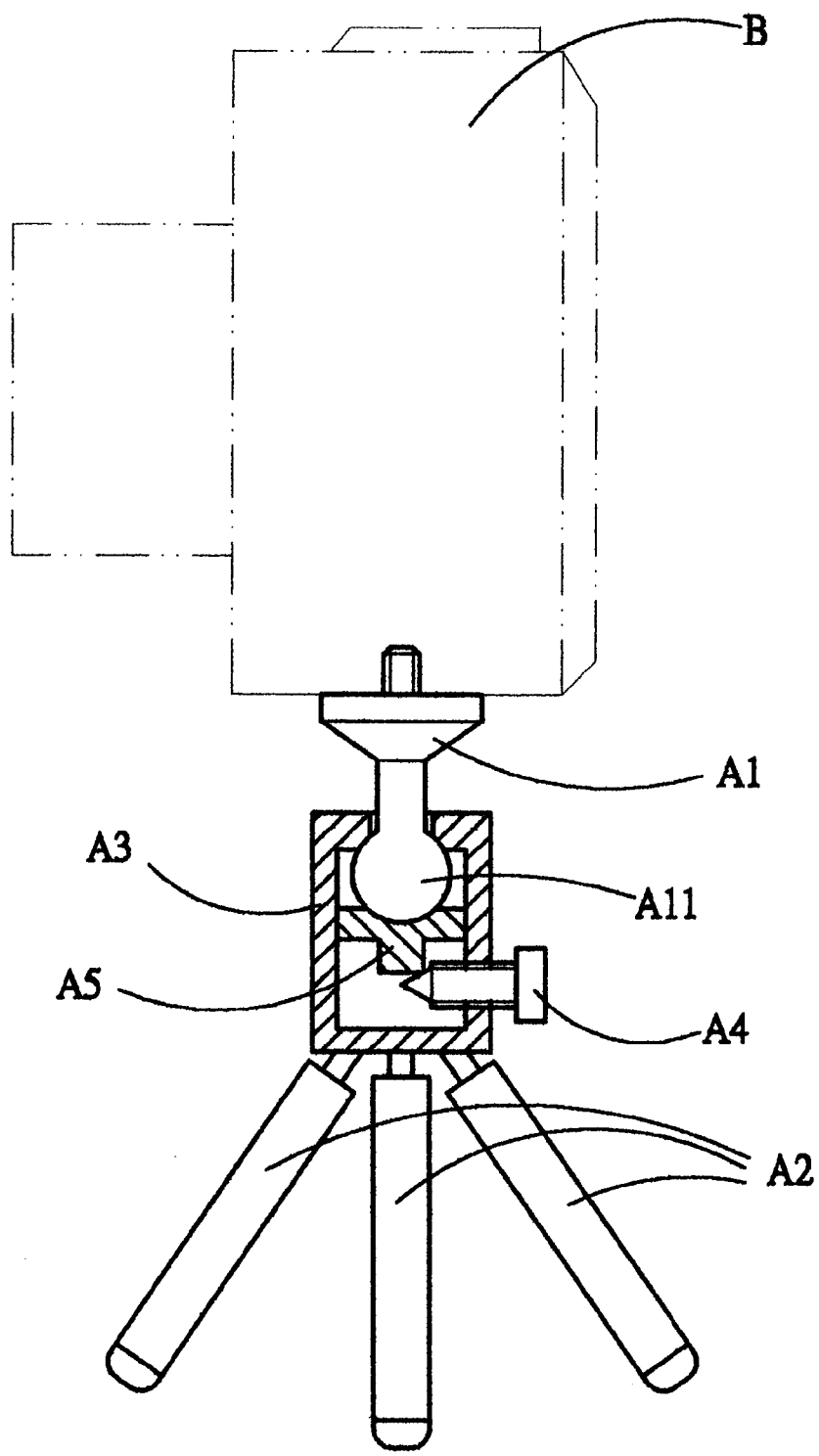
FIG. 1 is a schematic view of the prior art.
Figure 2:
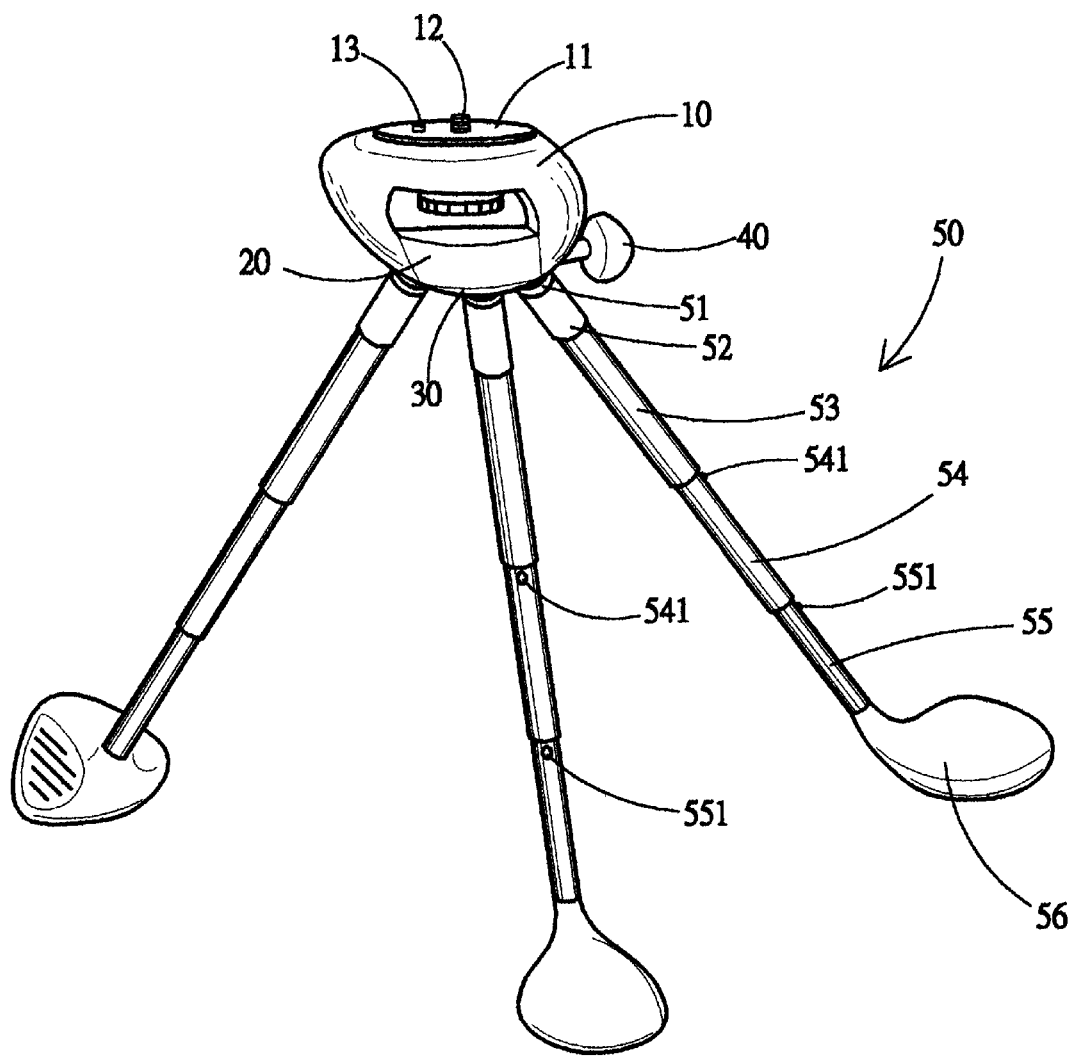
FIG. 2 is an assembled schematic view of the present invention.

With reference to FIG. 2, a preferred embodiment of the present invention includes a platform 10, a base 20, and a plurality of legs 50.

The platform 10 has a determined shape and has an upper side forming a contact surface. The contact surface is provided with a platform pad 11 and a securing screw 12 for mounting lockably a photographic apparatus. The contact surface is additionally provided with a projection 13 to enhance the stability of the locking function and to adapt to new models of photographic apparatus, such as digital cameras. The platform 10 further has a lower side connected to the base 20.

The base 20 has both lateral sides joined with the platform 10 such that the platform 10 can, using the joints as pivots, deviate within a limited distance so as to allow angle and position adjustments of the photographic apparatus. A rotary knob 4 having a screw rod 401 passes through the platform 10 and one of the lateral sides of the base 20 to lock the platform 10 and the base 20. In addition, a bottom side 24 of the base 20 is coupled to a lower base cover 30 for assembly of the legs 50.

The legs 50 are telescopic to allow adjustment of their length and are provided to support the entire structure in a firm and stable manner.

Figure 3:
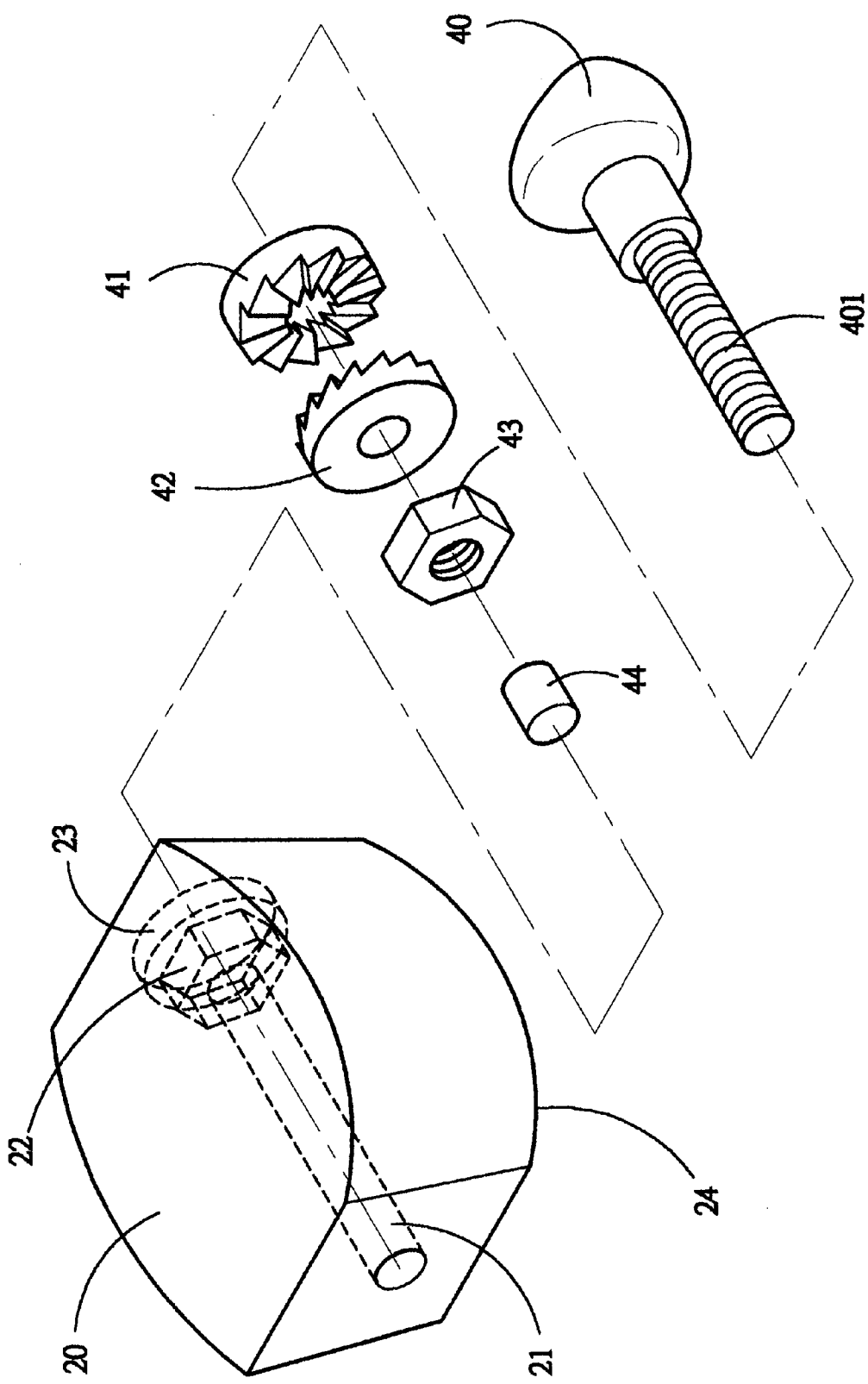
FIG. 3 is an exploded schematic view of an adjusting structure of the present invention.
Figure 5:
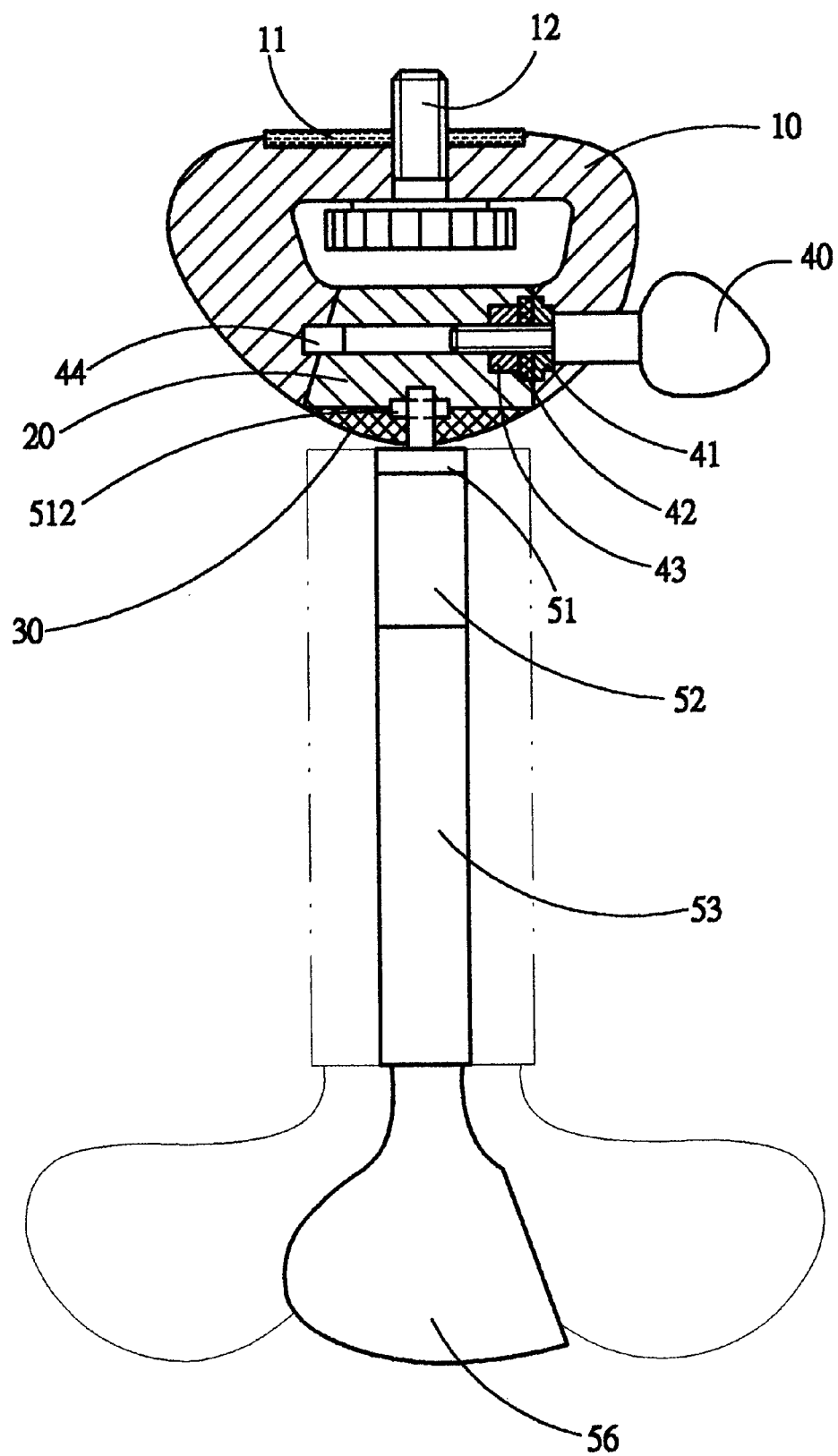
FIG. 5 is an assembled sectional view of the present invention.

Referring to both FIGS. 3 and 5, which illustrate the assembly relationship of the platform 10 and the base 20, a through hole 21 goes from one lateral side of the base 20 to the other lateral side. An axial block 44 is fitted into one end of the through hole 21 for abutting a corresponding surface of the platform. The other end of the through hole is provided with a nut receiving recess 22 and a left clutch receiving recess 23 for receiving a nut 43 and a left clutch 42, respectively. A right clutch 41 is provided on a corresponding side of the platform 10. The rotary knob 40 with the screw rod 401 passes through the platform 10 to screwably join the right clutch 41, the left clutch 42, and the nut 43. It can therefore be seen that the platform 10 and the base 20 are coupled by means of the axial block 44 and the screw rod 401 at both ends of the through hole 21. Besides the axial block 44 and the screw rod 401 together serve as a pivot which enables the platform 10 to perform limited deviation relative to the base 20, thereby allowing adjustment of the angle and position of the photographic apparatus on the platform 10. When it is desired to secure the position after adjustment, the user can utilize the rotary knob 40 to drive the screw rod 401 into the base 20 so that the teeth of the left and right clutches 42, 41 inter-engage to achieve firm positioning of the platform 10. Turning of the rotary knob 40 in a reverse direction causes the screw rod 401 to withdraw so that the teeth of the left and right clutches disengage. At this time, the platform 10 is unconstrained and can deviate for adjustment purposes. Compared to the prior art that uses the friction generated by inter-pressing of structural members, the present invention utilizes the tight securing function of the Clutches to provide enhanced stability. Besides, wear can be considerably reduced. furthermore, it does not require a large force to turn the rotary knob 40 in order to achieve a firm securing effect.

Figure 4:
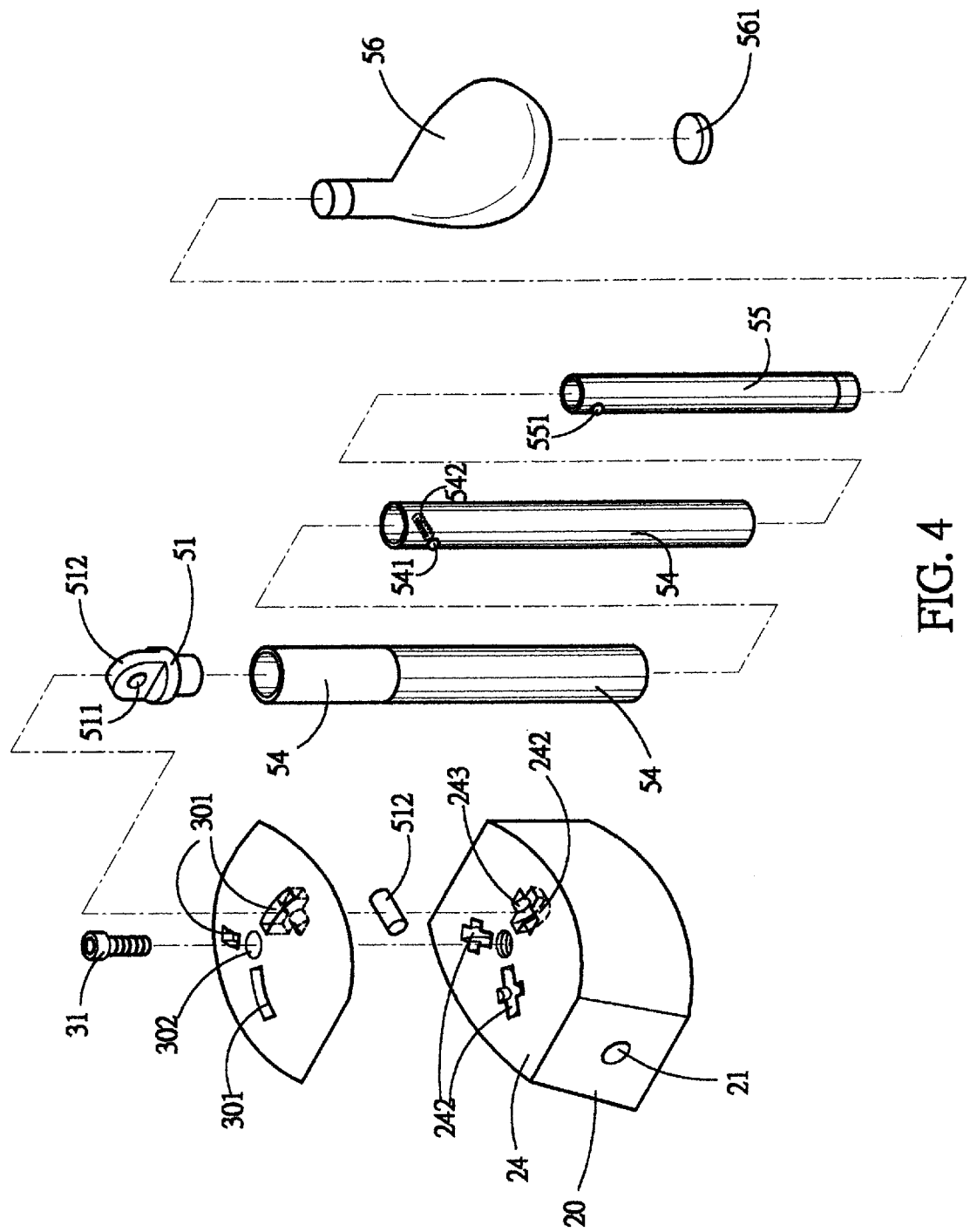
FIG. 4 is an exploded schematic view of a leg of the present invention.

Reference is made to FIGS. 4 and 5, which show connection of the legs 50. In order to better illustrate the connection relationship of the legs 50, the bottom side 24 of the base 20 is depicted to be oriented upwardly, and only one of the legs 50 is shown. Referring to FIG. 4, the bottom side 24 of the base 20 has a central portion provided with a securing screw hole 241. A plurality of grooves 242 is distributed around the securing screw hole 241 in a radiating pattern. Each of the grooves 242 has both sides provided with rotary shaft receiving grooves 243, respectively. The lower base cover 30 is provided with a securing hole 302, rectangular through holes 301, and rotary shaft receiving recesses at positions corresponding to the securing screw hole 241, grooves 242 and rotary shaft receiving grooves 243. Each leg 50 has a plurality of segments, depending on the desired length. In the embodiment shown in FIG. 4, the leg 50 includes three segments, namely, a leg connector 51, a leg sleeve 52, and a hollow leg tube 53. The leg tube 53 accommodates therein a first telescopic tube 54 of a smaller diameter. The telescopic tube 54 in turn accommodates therein a second telescopic tube 55 of a still smaller diameter. A rear end of the second telescopic tube 55 is connected to a leg cushion 56. A rear end of the leg cushion 56 has a soft leg pad 561 attached thereto. One end of each of the first and second telescopic tubes 54, 55 is provided with a retaining projection 541, 551 that utilizes the tension provided by an elastic element 542 disposed inside the first and second telescopic tubes 54, 55 to project from the walls of the first and second telescopic tubes 54, 55. When the leg 55 is fully extended, the projecting retaining projections 541, 551 can urge against lower rims of the leg tube 53 and first telescopic tube 54 to prevent the extended leg 50 from retracting upon an impact inadvertently exerted thereon, thereby ensuring the supporting stability of the legs 50.

In assembly of each leg 50, the leg connector 51 has a connecting block 512 thereof passing through a respective one of the rectangular through holes 301. A rotary shaft 513 passes through a shaft hole 511 in the connecting block 512 and is received in a respective one of the rotary shaft receiving grooves 243. A securing screw 31 passes through the securing hole 302 in the lower base cover 30 into the securing screw hole 241 of the base 20 so that the lower base cover 30 can be coupled to the bottom side 24 of the base 20, and the rotary shaft 514 is positioned in the rotary shaft receiving groove 243. The connecting block 512 of the leg connector 51 can utilize the rotary shaft 514 as a pivot to swing about in a space commonly defined by the groove 242 of the base 20 and the rectangular through hole 301 of the lower base cover 30, thereby allowing closure of the legs 50 inwardly towards the center or outward extension thereof.

In summary the tripod according to the present invention utilizes a rotary knob to drive a screw rod into the base, and makes use of the inter-engageable teeth of the left and right clutches to achieve firm positioning. Withdrawal of the screw rod by turning the rotary knob in a reverse direction will allow disengagement of the teeth of the left and right clutches. Hence, deviation of the platform on which the photographic apparatus is supported is adjustable and the platform is positively positioned. Compared to the prior art that utilizes friction generated by inter-pressing of structural members, the present invention provides enhanced stability and considerably reduces wear. Besides, locking force required to achieve firm positioning need not be great. The structure of the telescopic legs further adds to the practicality of the tripod of the present invention by making it convenient and compact to carry and store.

Although the present invention has been illustrated and described with reference to the preferred embodiment thereof, it should be understood that it is in no way limited to the details of such embodiment but is capable of numerous modifications within the scope of the appended claims.

What is claimed is:

1. A tripod, comprising:
    a platform of a determined shape and having an upper side forming a contact surface, said contact surface being provided with a platform pad and a securing screw for mounting lockably a photographic apparatus, said platform further having a lower side;
    a base being connected to said lower side of said platform and having joints connecting both lateral sides with said platform such that said platform can, using the joints as pivots, deviate within a limited distance so as to allow angle and position adjustments of said photographic apparatus on said platform, said base having a bottom side; and
    a plurality of legs being assembled to said bottom side of said base, said legs being telescopic to allow length adjustment and being provided to support said tripod in a firm and stable manner, wherein
    a through hole goes from one lateral side of said base to the other lateral side, an axial block being fitted into one end of said through hole for abutting a corresponding surface of said platform, the other end of said through hole being provided with a nut receiving recess and a left clutch receiving recess receiving a nut and a left clutch, respectively, a right clutch being provided on a corresponding side of said platform, a rotary knob having a screw rod passing through said platform to screwably join said right clutch, said left clutch, and said nut, said rotary knob being turnable to drive said screw rod thereof into said base so that teeth of said left and right clutches inter-engage to achieve firm positioning of said platform, said rotary knob being turnable in a reverse direction to cause said screw rod to withdraw so that said teeth of said left and right clutches disengage, whereby said platform is unconstrained and can deviate for adjustment purposes.

2. The tripod as defined in claim 1, wherein said bottom side of said base has a central portion provided with a securing screw hole, a plurality of grooves being distributed around said securing screw hole in a radiating pattern, each of said grooves having both sides provided with rotary shaft receiving grooves, respectively, said base further having a lower base cover that is provided with a securing hole, rectangular through holes, and rotary shaft receiving recesses at positions corresponding to said securing screw hole, said grooves and said rotary shaft receiving grooves of said bottom side of said base;

each of said legs having a plurality of segments, including a leg connector, a leg sleeve, and a hollow leg tube, said leg tube accommodating therein a first telescopic tube of a smaller diameter, said telescopic tube in turn accommodating therein a second telescopic tube of a still smaller diameter, a rear end of said second telescopic tube being connected to a leg cushion, one end of each of said first and second telescopic tubes being provided with a retaining projection that utilizes the tension provided by an elastic element disposed inside said first and second telescopic tubes to project from walls of said first and second telescopic tubes, whereby when said legs are fully extended, said retaining projections can urge against lower rims of said leg tube and said first telescopic tube to prevent said legs from retracting upon an impact inadvertently exerted thereon; and said leg connector having a connecting block passing through a respective one of said rectangular through holes, a rotary shalt passing through a shaft hole in said connecting block and being received in a respective one of said rotary shalt receiving grooves, a securing screw passing through said securing hole in said lower base cover into said securing screw hole of said base so that said lower base cover can be coupled to said bottom side of said base, and said rotary shalt is positioned in said rotary shaft receiving groove, said connecting block of said leg connector utilizing said rotary shaft as a pivot to swing about in a space commonalty declined by said groove of said base and said rectangular through hole of said lower base cover, thereby allowing closure of said legs inwardly towards the center or outward extension thereof.

\* \* \* \* \*